United States Patent [19]

Wang

[11] Patent Number: 5,022,500
[45] Date of Patent: Jun. 11, 1991

[54] DISC BRAKE CALIPER

[75] Inventor: Nui Wang, Croyden, Australia

[73] Assignee: Brake and Clutch Industries Australia Pty. Ltd., East Bentleigh, Australia

[21] Appl. No.: 404,579

[22] Filed: Sep. 8, 1989

[30] Foreign Application Priority Data

Sep. 14, 1988 [AU] Australia .............................. PJ0418

[51] Int. Cl.⁵ ..................... F16D 55/00; F16D 55/18; F16D 65/38
[52] U.S. Cl. ................................ 188/73.31; 188/71.1; 188/72.4; 188/73.39; 188/73.43; 188/73.47
[58] Field of Search .................... 188/73.31, 72.4, 72.5, 188/73.43, 73.47, 70 R, 71.1, 72.6, 73.32, 73.34, 73.35, 73.36, 73.39, 205 A, 205 R, 71.8, 370, 73.45, 72.3

[56] References Cited

U.S. PATENT DOCUMENTS

| | | | |
|---|---|---|---|
| 3,887,045 | 6/1975 | DeHoff et al. | 188/73.45 |
| 4,306,636 | 12/1981 | Burgdorf et al. | 188/73.43 |
| 4,375,842 | 3/1983 | Melinat | 188/72.3 X |
| 4,410,070 | 10/1983 | Hagiwara et al. | 188/73.31 X |
| 4,448,287 | 5/1984 | Katagiri et al. | 188/73.31 |
| 4,460,068 | 7/1984 | Cybulski et al. | 188/71.8 |
| 4,530,423 | 7/1985 | Ritsema | 188/73.39 |
| 4,540,068 | 9/1985 | Ritsema | 188/72.3 X |
| 4,775,034 | 10/1988 | Pachner et al. | 188/73.45 |
| 4,784,243 | 11/1988 | Méry | 188/73.45 |

FOREIGN PATENT DOCUMENTS

| | | | |
|---|---|---|---|
| 2946253 | 6/1981 | Fed. Rep. of Germany | 188/73.31 |
| 0072934 | 4/1987 | Japan | 188/73.31 |

Primary Examiner—Douglas C. Butler
Attorney, Agent, or Firm—Stevens, Davis, Miller & Mosher

[57] ABSTRACT

The invention is particularly concerned with a caliper for a disc brake assembly. The caliper includes a cylinder and a bridge, the bridge having an inboard portion which attaches to the cylinder, a central portion, and an outboard portion. Inboard and outboard friction pad assemblies are arranged to be brought into contact with opposite faces of the disc. The bridge is formed of a resiliently flexible material and is shaped and configured such that under braking conditions the outboard portion is able to resiliently deflect relative to the inboard portion in a direction transverse to the axis of the cylinder and substantially parallel to the direction of movement of the disc at the region where the friction pad assemblies are in engagement with the faces of the disc. The bridge and cylinder may be separately formed and connected together or they may be integrally formed.

16 Claims, 10 Drawing Sheets

DISC BRAKE CALIPER

INTRODUCTION

This invention relates to disc brake assemblies and more particularly to the caliper of disc brake assemblies. The invention will be particularly described with reference to pad guided disc brake assemblies but it is to be understood that the invention may be used with other types of assemblies, such as, for example pin guided assemblies.

BACKGROUND OF THE INVENTION

Figure 1:
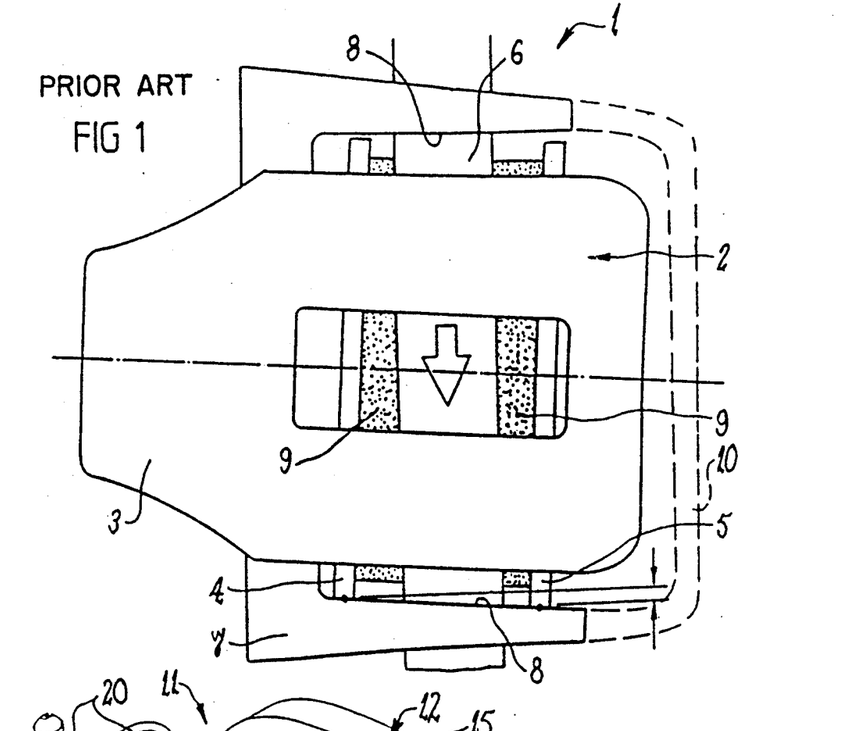
FIG. 1 shows a prior art disc brake assembly in diagrammatic plan view.

Braking of motor vehicles sets up considerable stresses in the brake components which accordingly deflect, to a greater or lesser extent depending on the loading on and nature of the particular component. Disc brake assemblies are no different and FIG. 1 of the attached drawings depicts diagrammatically a prior art disc brake assembly under braking conditions. As shown in FIG. 1 a disc brake assembly 1 includes a caliper 2 on the inboard side of which a cylinder 3 is integrally formed. A piston (not shown) is slidable within the cylinder 3 and is connected to an inboard pad assembly 4. An outboard pad assembly 5 is connected to the outboard side of the caliper 2 and the two pad assemblies are arranged to clamp onto a disc 6 which is mounted to rotate with the motor vehicle on which the assembly is mounted. An anchor bracket 7 is fixed to the vehicle and slideways 8 are formed on the anchor bracket. The slideways 8 serve to support and guide the pad assemblies 4 and 5 under braking conditions. As shown in an exaggerated manner in FIG. 1 there is a tendency for the anchor bracket 7 to deflect under load which in turn results in the caliper tilting relative to the axis of rotation of the disc and hence uneven loading being applied by the pad assemblies. The friction pads 9 of the pad assemblies tend to taper after continued use and this leads to brakes off, brake drag and reduced performance due to skew pad pressure distribution. Reduced pad life also results.

This problem applies to the caliper of both pad guided or pin guided constructions. This problem can be reduced to some extent by making the anchor bracket less deflectable by, for example, providing a tie bar (indicated by dotted lines 10) on the outboard side of the bracket, or alternatively making the anchor bracket stronger. Both these solutions result in an anchor bracket which is substantially heavier than is desirable, and is accordingly more expensive. The weight factor is imPortant since there is a need to keep vehicle weight as low as possible to thereby enhance vehicle operational characteristics. It has also been found that, although the deflection is reduced using either of these solutions, deflection does still occur which is undesirable.

A further disadvantage of prior art disc brake assemblies is complexity of manufacture, limited possibilities to utilize assemblies in a variety of vehicles, high cost of manufacture, and high weight.

A further problem arises as a result of vehicle variations. It will be appreciated that motor vehicles require a brake system which is specifically adapted to compliment the characteristics of that vehicle, and accordingly, where disc brakes are used, disc diameters and brake components are selected to compliment each particular model of vehicle. Motor vehicle manufacturers now produce wide ranges of models having differing weights and speeds and accordingly, it has been necessary to produce a wide range of disc brake assemblies. The necessity to provide this range adds significantly to the cost of assemblies, particularly where a particular assembly is only required for a short production run, as the capital outlay needed to produce a particular assembly has to be recouped from only a limited number of items.

It is an object of the invention to provide a disc brake assembly in which the abovementioned pad taper problem is diminished to a significant extent. A further object is to provide a caliper which allows for a light weight disc brake assembly. A yet further object of the invention is to provide a disc brake assembly suitable for use on a variety of vehicles which requires only minimum adaptation for different vehicles.

SUMMARY OF THE INVENTION

According to the invention there is provided a disc brake assembly engagable with a disc rotatably mounted on a vehicle, and supported on an anchor bracket mounted in fixed relation to the vehicle, comprising, a caliper having an inboard portion and an outboard portion on opposite sides of the disc, said inboard and outboard portions being connected by a central portion, a cylinder mounted to said inboard portion, a piston slidably mounted in said cylinder, inboard and outboard friction pads having planar faces adapted to be brought into frictional contact with opposite faces of the disc, characterised in that under braking conditions the outboard portion of said bridge housing is resiliently deflectable relative to said inboard portion in a direction transverse to the axis of said cylinder and parallel to the direction of movement of said disc at the region where said friction pads are in engagement with said disc.

BRIEF DESCRIPTION OF THE DRAWINGS

Various embodiments of the invention will now be described by way of examples, reference being made to the accompanying drawings. In the drawings.

DETAILED DESCRIPTION OF THE DRAWINGS

Figure 2:
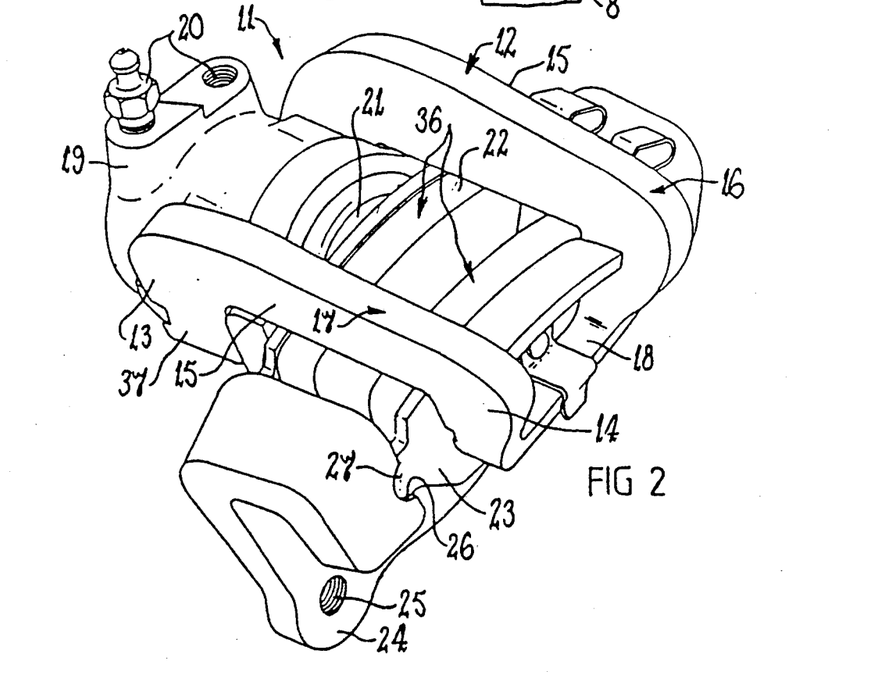
FIG. 2 shows a perspective view of one embodiment of disc brake assembly according to the invention.

A disc brake assembly according to the invention can be constructed in various ways. As shown in FIG. 2, caliper 11 includes a bridge 12 having an inboard portion 13 and an outboard portion 14, those two portions being joined by a central portion 15. The form of bridge 12 depicted in FIG. 2 has two substantially symmetrical sections 16 and 17 each of substantially inverted U-shaped form, the two sections 16 and 17 being joined together at the outboard side 14 of the bridge 12 by a web 18. The inboard side 13 of the bridge has a cylinder 19 mounted thereto, that cylinder 19 generally being known as a pot. The pot 19 has hydraulic fluid connections 20 for supplying pressurized fluid to the cylinder, and a piston 21 is slidable within the cylinder for operating the brakes. The caliper 11 includes an inboard friction pad assembly 22 and an outboard friction pad assembly 23. An anchor bracket 24 is adapted to be mounted to a motor vehicle by mounting holes 25 and the bracket 24 has slideways 26 on either side thereof in which the ends 27 of the pad assemblies 22, 23 slide.

Figure 3:
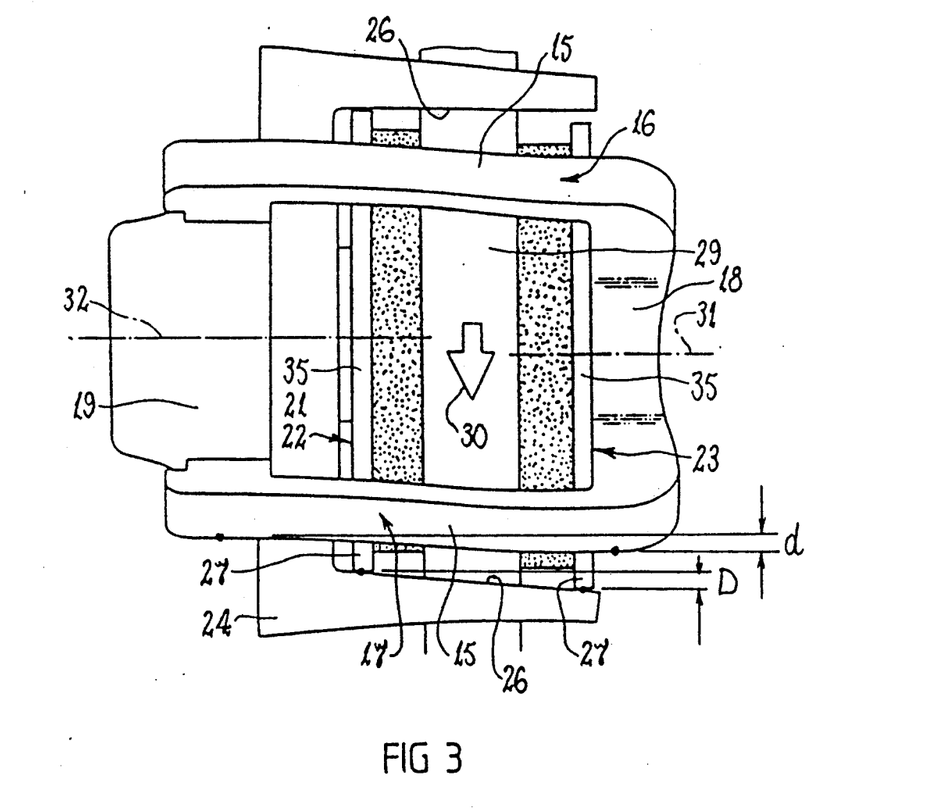
FIG. 3 shows a plan view of the assembly of FIG. 2 under braking conditions.

The bridge 12 is preferably formed from a resilient steel material so that the central portion 15 can flex in a direction parallel to the pads under braking conditions. FIG. 3 depicts the manner in which the bridge 12 is able to deflect, although the FIG. 3 deflection is exaggerated for ease of description.

The deflection of the bridge 12 in this specification is referred to as being in a "lateral" direction. The term "lateral" is to be understood as meaning substantially transverse to the axis of rotation of the disc with which the brake assembly is to be used, and substantially parallel to the circumference of that disc at the region where the pad assemblies contact the disc. "Axial" deflection on the other hand means perpendicular to lateral deflection and parallel to the axis of the disc, i.e., in the direction of the axis of the caliper cylinder. It is desirable that axial deflection be kept low.

As shown in FIG. 3 the inboard and outboard pad assemblies 22, 23 are clamping onto a disc 29 which is rotating in the direction of arrow 30. Because of the cantilever nature of the anchor bracket 24 the slideway 26 on which the ends 27 of the pad assemblies are bearing tilts relative to the axis of rotation of the disc 29. The outboard pad assembly 23 thus moves a distance equal to the deflection of the slideway 26, but because the slideway 26 is tilting, the distance the outboard pad 23 moves is greater than the distance the inboard pad 22 moves. The difference between the distances which the two pads move is depicted by the dimension D in FIG. 3. To accommodate this difference in movement the central portion 15 of the bridge 12 deflects. The outboard portion 14 deflects a greater distance than the inboard portion 13, the difference in those deflections being depicted by the dimension d. Preferably dimensions D and d are equal and the friction pad assemblies 22, 23 remain parallel with the faces of the disc 29. In this manner tapered wear of the friction facings of the pad assemblies is at least substantially avoided even though the centre lines 31, 32 of the forces applied by each of the pad assemblies are not co-linear.

It will be appreciated that it is still important for the bridge 12 to be substantially rigid in an axial direction, that is, the planes of the backing plates 35 of the pad assemblies must be kept parallel. If the inboard and outboard portions of the bridge 12 were able to splay under load there would be a tendency for the radially outer edges 36 of the friction facings 32 to wear more rapidly than the radially inner edges. The bridge 12 depicted in FIGS. 2 and 3 obtains this axial rigidity by the manner in which it is formed. It will be noted that the depth (measured radially) of the central portion 15 of each of the two sections 16 and 17 is greater than the width (measured in the circumferential or lateral direction) of those sections. The two sections are also angled slightly relative to each other such that the plane of each section 16, 17 is substantially aligned with a radius of the disc with which the brake assembly is to be used.

A further important aspect of the invention is the manner in which the bridge 12 is connected to the pot or cylinder 19. The inboard portion 13 is preferably formed in the manner of a pair of cranked arms 37 which hold the pot 19 between them. The manner in which the pot 19 is held can vary although it is important that no tilting of the pot relative to the bridge 12 about an axis joining the two connecting abutments is able to occur. In one preferred arrangement the cranked arms 37 are biased towards each other and clamp the pot 19 between them. As depicted in FIG. 2 the bridge 12 is formed from plate steel of uniform thickness cut into a C-shaped form and bent to the required configuration. The free ends of that C-form form the cranked arms 37. The arms 37 of the bridge 12 prior to assembly with the pot 19 are spaced apart a distance which is less than the width of the pot. Once the pot is forced into position between the arms 37 the resilience of the material from which the bridge is made ensures that the pot 19 is firmly clamped between the cranked arms 37.

Figure 4A:
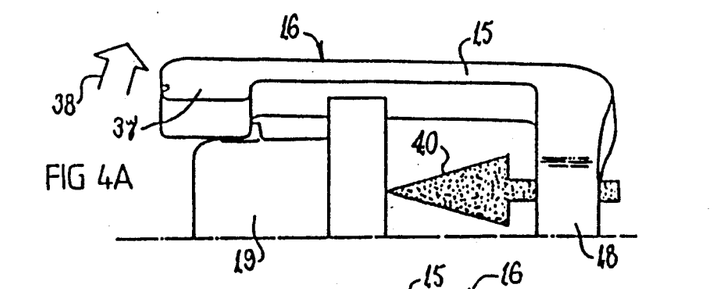
FIGS. 4A and 4B show a bridge and pot assembly during and after the assembly of those two components.
Figure 4B:
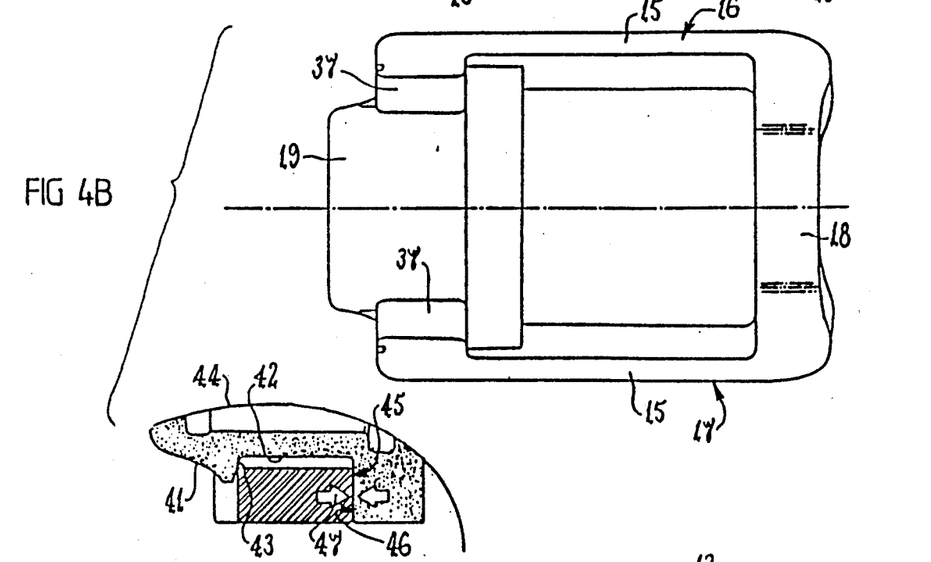

FIGS. 4A and 4B depict the assembly procedure. As shown in FIGS. 4A and 4B the pot 19 is located between the two sections 16 and 17 and is pushed in the direction of arrow 40. Tapered surfaces 41 on the inboard side of the pot urge the cranked arms 37 apart (see arrow 38) and allows the pot 19 to locate between the arms 37. A recess 42 is defined on each side of the pot 19 and the arms 37 snap into those recesses when the pot 19 is pushed home.

A tapered surface 43 on the inboard side of each recess 42 engages each of the cranked arms (as shown in enlarged view 44 of part of FIG. 3) to urge an alignment surface 45 on each arm 37 into engagement with an abutment surface 46 on each side of the pot 19. Thus, the bias force on the two arms 37 towards each other is directed by the tapered surfaces 43 to cause the alignment surface 45 on each arm to firmly engage and seat on the abutment surface 46 on the pot 19. Arrows 47 depict the manner of this force.

As mentioned previously, it is important that the pot 19 is held square to the bridge 12, that is, the axis of the cylinder within the pot is perpendicular to the plane of the backing plates 35. The engagement between surfaces 45 and 46 holds the pot square with the bridge.

Figure 5A:
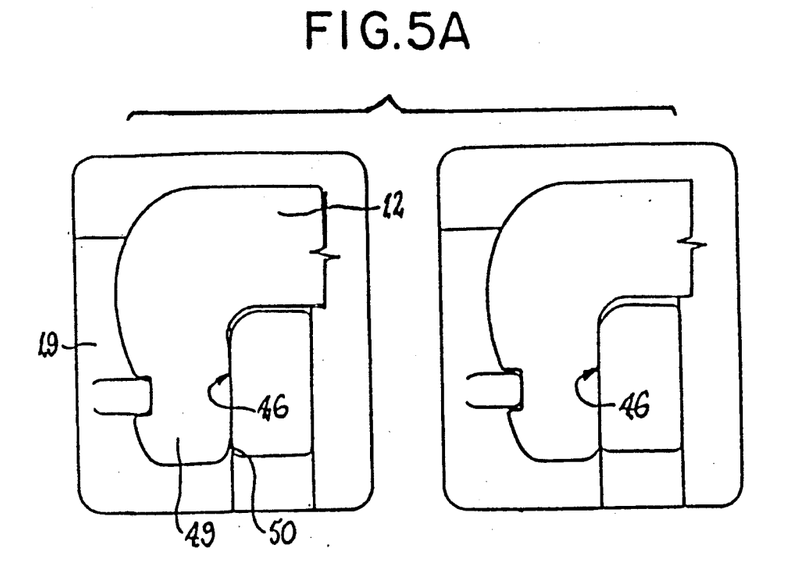
FIG. 5 shows a perspective view of a bridge according to the invention and enlargements depicting the connection between the bridge and the pot.
Figure 5B:
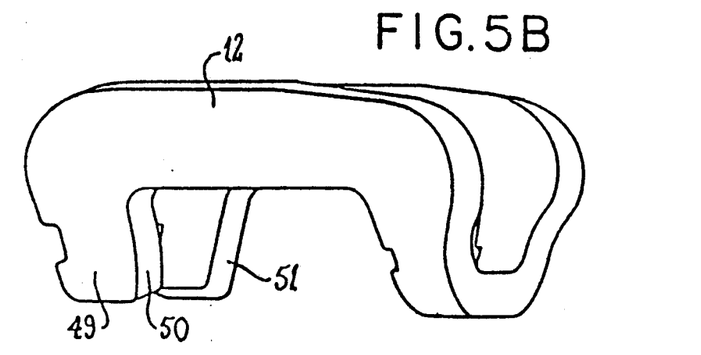

FIG. 5 shows another possible practical arrangement by which this is achieved. As shown, the alignment surface 50 on the right hand cranked arm 49 is of slightly convex form so that the surface 50 only touches the abutment surface 46 on the pot at a single small zone. The left hand abutment surface 51 is, however, square so as to square up with the abutment surface 46 on the lefthand side of the pot. The aforementioned bias force thus holds the two alignment surfaces 50, 51 in firm engagement with their respective abutments 46 and thus the pot in correct alignment with the bridge. The rounded form of the alignment surface 50 means that only one of the surfaces 50, 51 needs be machined square with the pot. The convex surface 50 is in firm contact with its abutment 46 but the two surfaces 50, 51 do not need to be square with each other, and the two abutment surfaces can also be slightly skewed. Provided alignment surface 51 is properly square the bridge 12 will be correctly aligned with the pot 19.

Although the invention aims at click fitting of pot and bridge to reduce parts and simplify manufacturing and assembly, suitable fasteners such as pins, rivets or screws can be used to permanently secure the bridge and pot together if so desired.

An advantage of having the pot 19 and bridge 12 formed as separate components is that variations in the brake assembly which are necessary to accommodate vehicle differences can be obtained by altering only one of the components. In the preferred arrangement it is envisaged that the pot 19 will be varied to suit a particular vehicle whilst the bridge 12 will remain unaltered for a range of vehicles covering differing disc diameters and thicknesses. For example, where a high braking force is required this can be achieved by boring the cylinder in the pot 19 to a larger diameter and using a correspondingly larger piston 21. Generally, it is envisaged that most conventional variations will be accommodated by simply boring the cylinder in the pot 19 to the required diameter and/or casting the abutments on the pot at different positions. The pot 19 and bridge 12 can be formed of different materials which can lead to a saving in the expensive alloy materials from which the pot is usually cast. The absence of the bridge from the pot makes boring of the pot easier to do, and simplifies piston insertion and testing operations.

Figure 6:
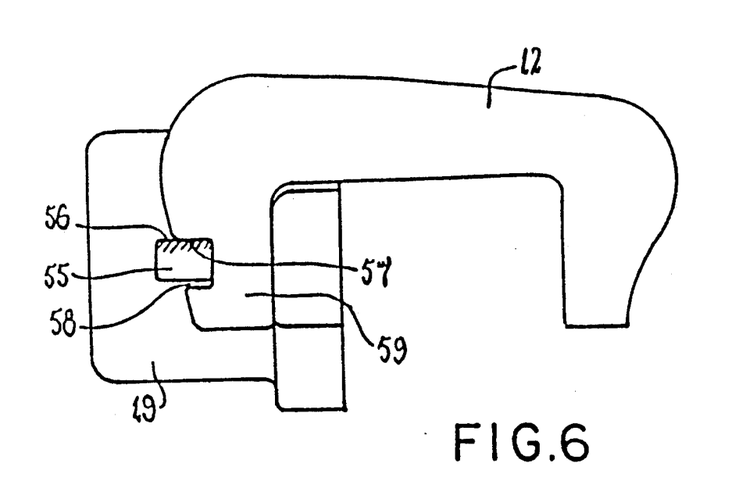
FIGS. 6 and 7 show side views of alternative location of abutments between bridge and pot.
Figure 7:
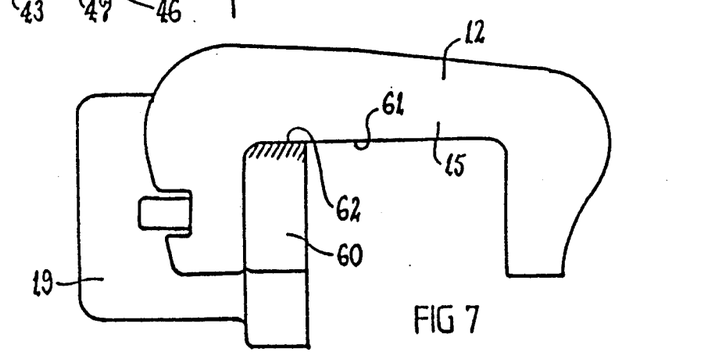

Alternative arrangements for ensuring the pot and bridge 12 are in proper alignment with each other are depicted in FIGS. 6 and 7. FIG. 6 shows an arrangement in which a lug 55 on the pot has an upper surface 56 which serves as an abutment surface for an alignment surface 57 formed on the lower side of a recess 58 in the cranked arm 59 of a bridge 12. FIG. 7 shows an arrangement in which an abutment surface 62 on a lug 60 on the pot 19 engages with an alignment surface 61 formed on the underside of the central portion of the bridge 12. Clearly, other arrangements are also possible.

Figure 8:
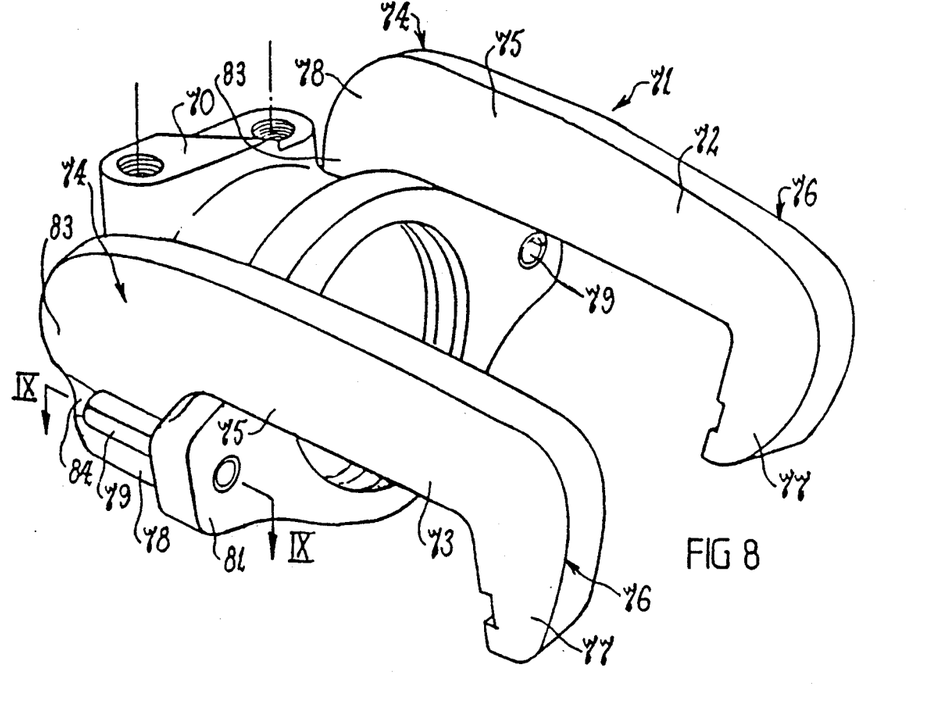
FIG. 8 shows a perspective view of a second embodiment of the invention.
Figure 9:
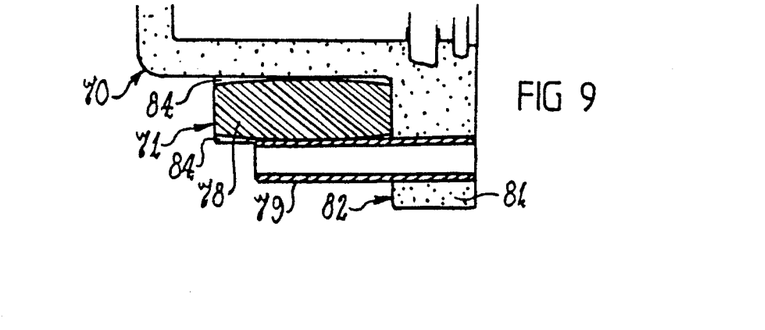
FIG. 9 shows a sectional view along line IX—IX of FIG. 8.

FIGS. 8 and 9 depict an alternative arrangement of bridge, and an alternative method of securing the bridge to the pot. As shown, a pot 70 of similar form to that described above is connected to a bridge 71 formed of two substantially identical sections, 72 and 73. Both sections have an inboard portion 74, a central portion 75 and an outboard portion 76. The outboard portions 76 each have a downwardly directed finger 77 for engagement with an outboard backing plate, whilst the inboard portions each have a cranked arm 78 which are mounted on opposite sides of the Pot 70. Once again, the two sections of the bridge are axially rigid, that is, the rigidity is such that the fingers 77 and cranked arms 78 are unable to move apart under braking load.

The bridge 71 is connected to the pot 70 in a pivotal manner. This will be more clearly understood with reference to FIG. 9. Each cranked arm 78 is held to its respective side of the pot 70 by means of a high strength stud 79. The studs are resiliently flexible and may be hollow, and are located in holes 80 formed in side wings 81 which are integral with the pot. The inboard faces 82 of the wings 81 serve as abutment surfaces for the bridge 71. Each face 83 of each cranked arm 78 has an elongate, convex rounded recess 84 formed therein and, on each arm 78, the stud 79 locates within that recess 84 to hold the arm 78 to the side of the pot 70. The contact between pot and arm 78 is against the inside rounded recess 84 as shown in FIG. 9. It will be appreciated that the bridge 71 will be able to tilt relative to the pot 70 due to the flexible nature of the studs 79. The rounded form of the recesses 84 facilitates that assembly.

With the construction shown in FIGS. 8 and 9 there will be lateral flexibility between pot and bridge permitting parallel movement and engagement of the pad assemblies (not shown) so that those pad assemblies avoid the tapered wear problems referred to above with reference to FIG. 1. However, the axial rigidity ensures that no taper occurs in a radial direction.

Figure 10:
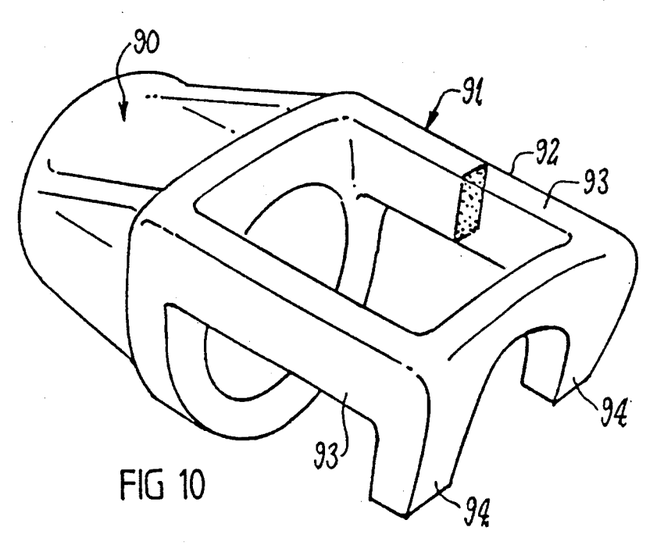
FIG. 10 shows a perspective view of a third embodiment of the invention.

FIG. 10 depicts a yet further embodiment. As shown in that drawing the pot 90 and bridge 91 can be made integral. The bridge 91 may include a central portion 92 formed of two parallel integral bridge elements or beams 93 having depths which are greater than their widths and which are thus more flexible in a lateral direction than in an axial direction. Fingers 94 are integrally formed with the central portion 92 on the outboard side of the bridge 91.

Figure 11:
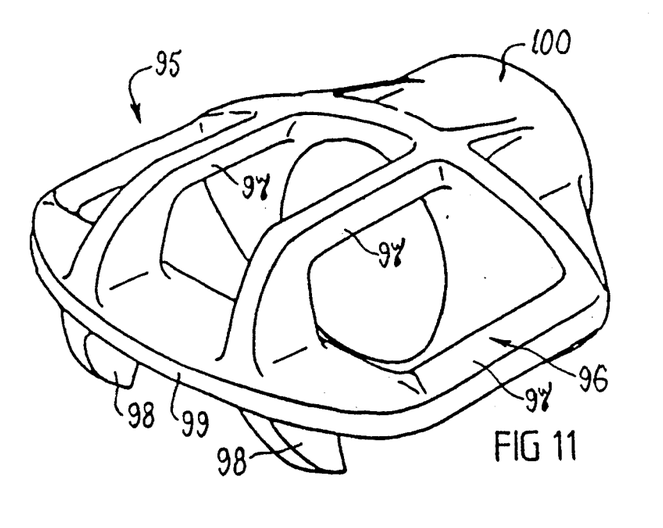
FIG. 11 shows a perspective view of a fourth embodiment of the invention.

FIG. 11 depicts a further embodiment which is similar to that shown in FIG. 10 except that the bridge 95 depicted in FIG. 11 is of more complex construction than that of FIG. 10. The caliper 95 includes a central portion 96 having a multi-element, frame like construction, the frame elements 97 having relatively small cross-sectional areas. As shown, the frame elements 97 are each of substantially square cross-sectional configuration at their mid points. Each frame element 97 does not itself necessarily have a stiffness which is greater in the radial direction than in the lateral direction. However, by virtue of the interactive arrangement of the elements, the caliper has a stiffness which is far greater in the radial direction than in the lateral direction. The frame elements 97 act in a composite manner to thereby permit lateral flexing under braking load. The fingers 98 of the bridge 95 are of significantly greater cross-sectional thickness than the frame elements 97 and this increased thickness provides the bridge with axial rigidity. A transverse beam 99 also of substantial cross-section on the outboard side of the bridge 95 ensures the frame elements 97 act in a composite manner. The bridge 95 is integral with the pot 100 and is preferably formed from a lightweight metal or alloy.

Figures 12, 13:
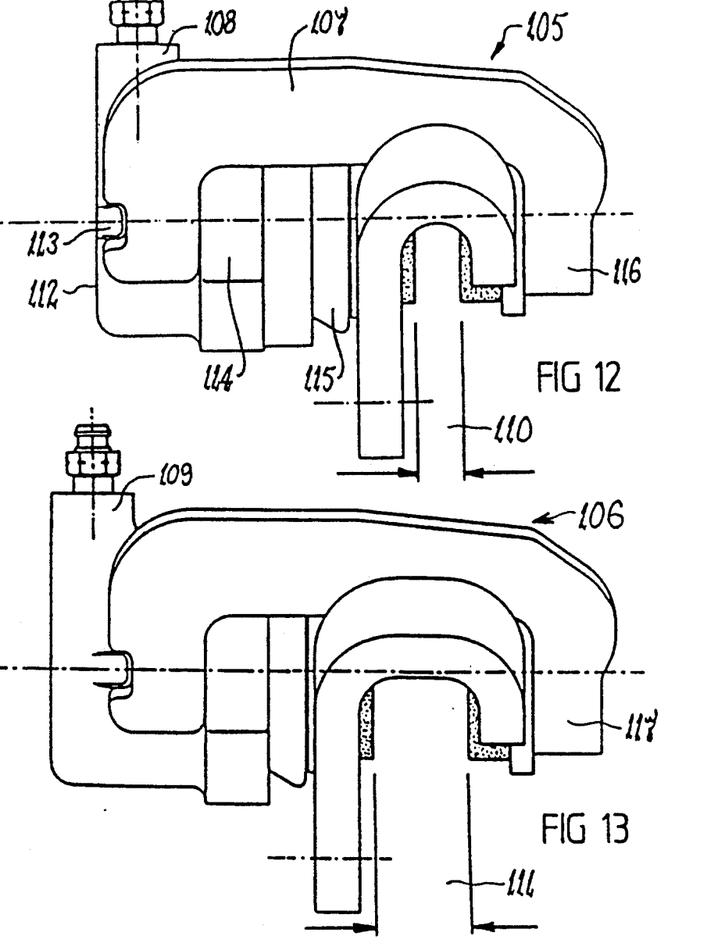
FIG. 12 shows a side view of a disc brake assembly according to the invention operable with a narrow disc.
FIG. 13 shows a side view of a disc brake assembly operable with a wide disc.

FIGS. 12 and 13 depict two different arrangements of disc brake assemblies, FIG. 12 showing an assembly 105 for use with a narrow thickness disc 110 whilst FIG. 13 depicts an assembly 106 for use with a wider thickness disc 111. In each of the two assemblies 105 and 106 the bridge 107 is identical. Differences in thickness of disc is accommodated by the manner in which the bridge 107 attaches to the respective pot 108 or 109.

As shown in FIG. 12 the bridge connects to the pot 108 at a position towards the inboard side 112 of the pot 108. Locating lugs 113 and abutments 114 ensure the bridge 107 and pot 108 are properly aligned in the manner referred to above. The piston 115 is thus positioned relatively close to the fingers 116 of the bridge 107 on the outboard side of the bridge 107.

The arrangement shown in FIG. 13 is different in that the connection between the bridge 107 and the fingers 117 is towards the centre of the pot 109. The pot 109 is thus further from fingers 117 on the outboard side of the caliper compared with the FIG. 12 arrangement permitting a wider disc 111 to be used.

Clearly, width differences in discs can be accommodated in different ways, for example, by having differing length pistons. However, differences for example in lug positions between FIGS. 12 and 13 are easily accommodated in the casting of the pot.

Figure 14:
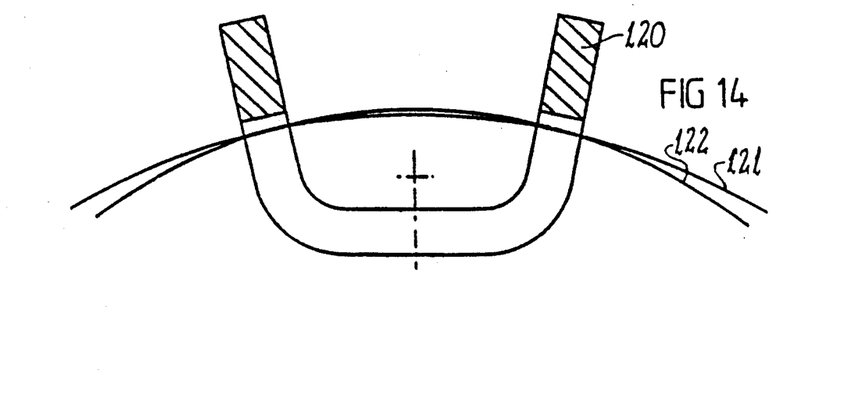
FIG. 14 shows a cross-sectional end view through a bridge according to the invention.

FIG. 14 depicts how a bridge 120 of the general type under discussion can be used with discs 121, 122 of differing diameters. A wide range of discs can thus be accommodated.

Figure 15A:
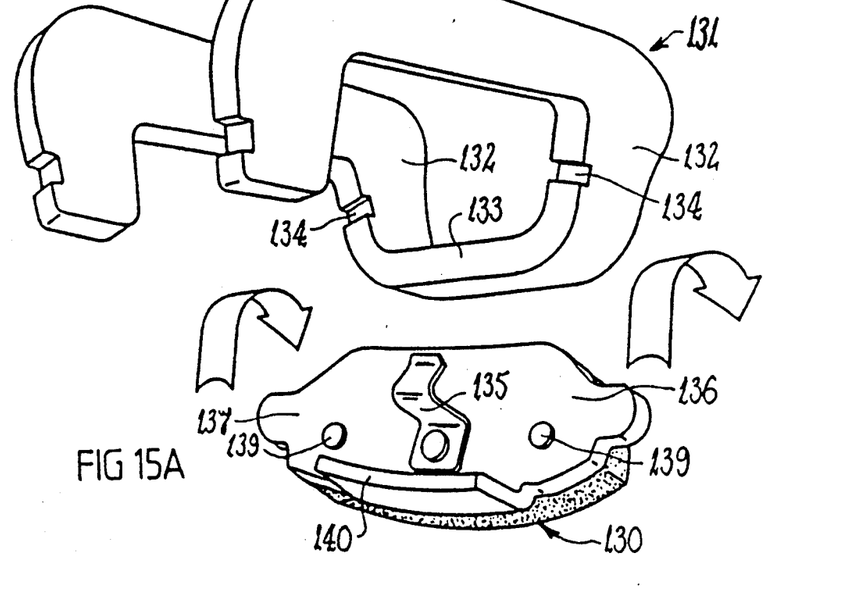
FIGS. 15A and 15B show the manner in which the outboard backing plate attaches to the bridge.
Figure 15B:
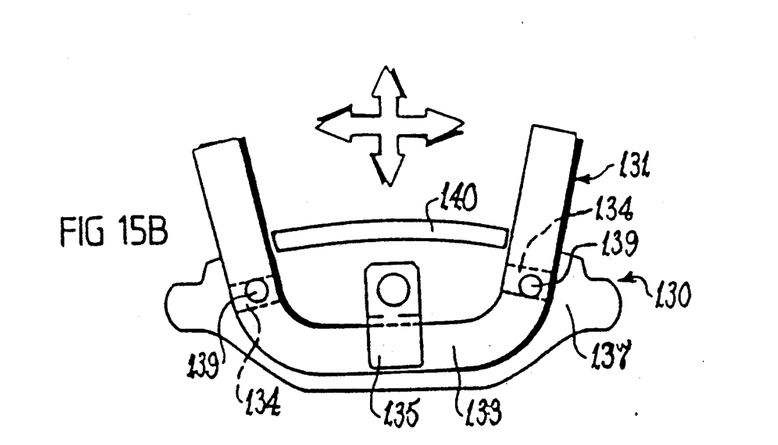

FIGS. 15A and 15B depict the manner in which the outboard pad assembly 130 connects to the outboard side of bridge 131. It will be noted that bridge 131 is similar to that described with reference to FIGS. 2 to 7 above. Bridge 131 has a pair of fingers 132 on the outboard side thereof joined by web 133. The inboard face of fingers 132 each have a rectangular groove 134 formed therein, those grooves 134 being aligned in a direction which is substantially parallel with the circumference of the disc with which the caliper 131 will be used. A spring clip 135 attached to the rear face 136 of backing plate 137 of pad assembly 130 is used to connect the pad assembly 130 to the web 133. Two lugs 139 are formed on the rear face 136 of the backing plate 137 and those lugs 139 are arranged to locate in the grooves 134. The interaction between the lugs 139 and grooves 134 limits the extent to which the pad assembly 130 can move relative to bridge 131. As shown in FIG. 15B the pad assembly 130 is able to rotate and move radially slightly relative to the bridge 131, the limit of that rotation and translation being defined by the relative dimensions of the grooves 134 and lugs 139.

The backing plate 137 also has a flange 140 which projects in an outboard direction and in an assembled condition locates between the fingers 132. Interaction between the fingers 132 and the flange 140 will limit the extent to which the outboard pad assembly 130 can move in a lateral direction relative to the bridge 131. Both the rotational and translational movements described above are for pad initial alignment to the bridge during installation.

Figure 16:
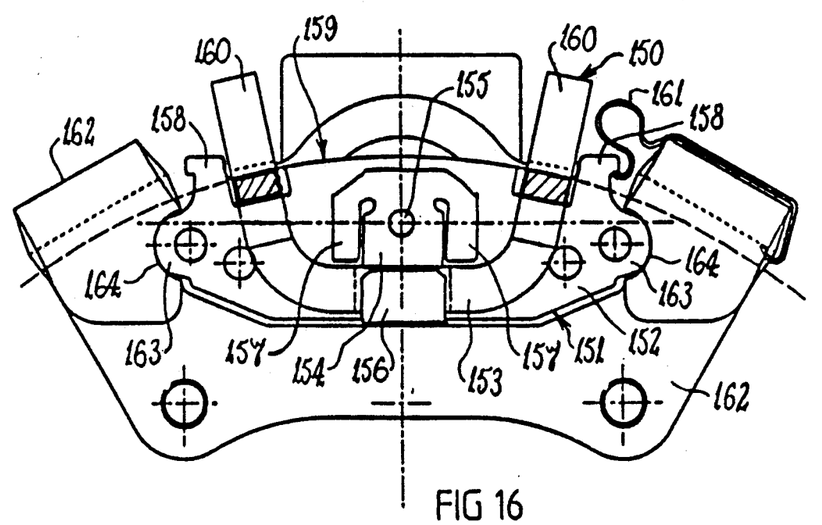
FIG. 16 shows an end view of a disc brake assembly depicting a further manner of attachment of the outboard backing plate to the bridge.

An alternative arrangement to that shown in FIGS. 15A and 15B is shown in FIG. 16. As shown, a bridge 150 supports a pad assembly 151 having a backing plate 152. The backing plate 152 is connected and biased to a web 153 of the bridge by a spring 154 which is secured to the backing plate by rivet 155. The frictional resistance to relative movement between the backing plate 152 and the web 153 provides a slip joint connection between those two components. The backing plate is prevented from moving upwardly by a U-shaped lower portion 156 of the spring 154 and is prevented from moving downwardly by side portions 157 of the spring 154. However, due to the designed clearance between the spring 154 and web 153 some permanent movement of the backing plate upwards and downwards is possible. Upstanding lugs 158 on the upper edge 159 of the backing plate 152 engage with the central portion 160 of the bridge 150 with side clearance to provide limits for the pad assembly 151 moving laterally relative to the bridge. An anti-rattle spring 161 acts between the anchor bracket 162 and one of those upstanding lugs 158. The ends 163 of the backing plate 152 slide in slideways 164 formed on the anchor bracket 162.

Figure 17:
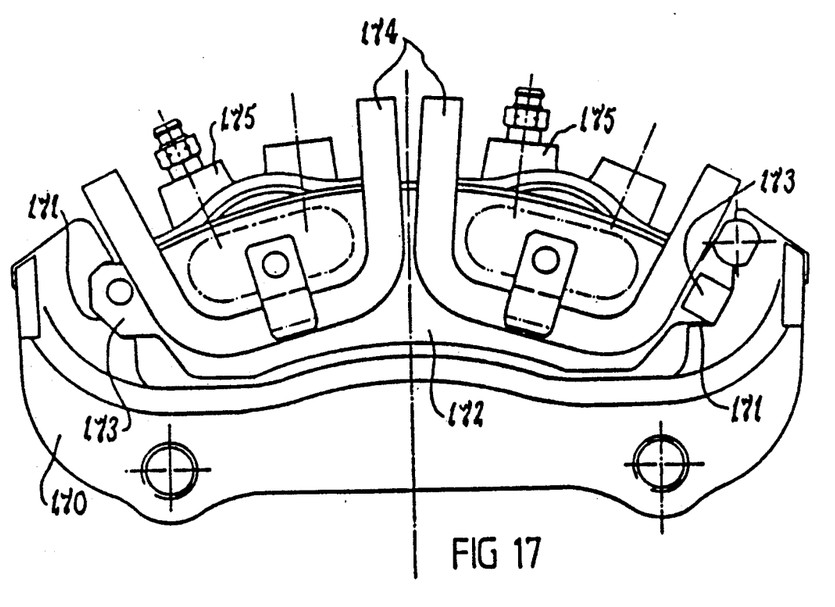
FIG. 17 shows an end view of a two caliper brake assembly.

FIG. 17 depicts a high performance application of the brake assembly. As shown, an anchor bracket 170 has two relatively widely spaced slideways 171. A pair of elongate pad assemblies 172 have ends 173 which slide in those slideways. Twin bridges 174 and pots 175 act on the pad assemblies. The bridges 174 can be of a form substantially identical to that shown in FIGS. 2 to 7 and the manner of attachment between bridges 174 and pots 175 can be similar to the arrangements described hereinbefore.

Figure 18:
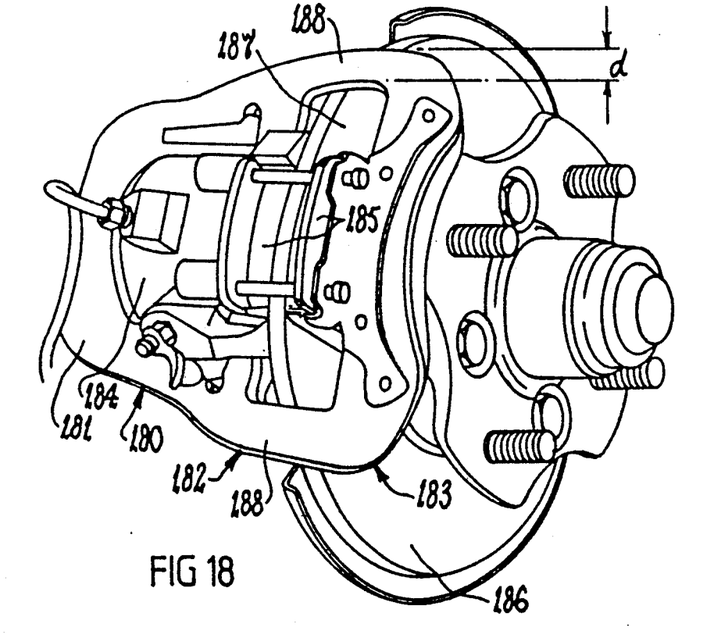
FIG. 18 shows a perspective view of a yoke type caliper according to the invention.

Lastly, as shown in FIG. 18, a yoke type caliper 180 is shown. The caliper 180 is comprised of metal plate having an inboard portion 181, a central portion 182, and an outboard portion 183. A cylinder assembly 184 is mounted to the inboard portion 181 and friction pad assemblies 185 are arranged to engage opposite faces of a disc or rotor 186. An elongate slot 187 is formed in the caliper 180 to enable the caliper 180 to fit over the disc 186 as shown in the drawing. The central portion 182 is formed by two web like strips 188 at each end of the slot 187. The strips 188 are integral with the inboard and outboard portions 181 and 183 and are formed of the same thickness metal plate as the inboard and outboard portions. However, the width of the strips 188 as depicted by dimension line "d" is significantly narrower than prior art yokes of this type so that, under braking conditions, the outboard portion 183 of the caliper 180 will be resiliently deflectable laterally relative to the inboard portion 181 thereof. The width of the strips 188 will be determined by the degree of flexibility required and by strength requirements of the caliper.

Various alterations, modifications and/or additions may be introduced into the constructions and arrangements of parts previously described without departing from the spirit or ambit of the invention as defined by the appended claims.

We claim:

1. A disc brake assembly engageable with a disc rotatably mounted on a vehicle, comprising,
an anchor bracket adapted to be mounted in fixed relation on a motor vehicle,
a caliper comprising a bridge and a cylinder, said bridge having an inboard portion and an outboard portion on opposite sides of the disc, said inboard and outboard portions being connected by a central portion,
said cylinder mounted to said inboard portion,
a piston slidably mounted in said cylinder,
inboard and outboard friction pad assemblies having planar faces adapted to be brought into frictional contact with opposite faces of the disc,
the rigidity of the central portion being such that the outboard portion of said caliper is resiliently deflectable relative to said inboard portion in a direction transverse to the axis of said cylinder and parallel to the direction of movement of said disc at the region where said friction pad assemblies are adapted to engage said disc, the rigidity of the caliper in a plane perpendicular to said deflectable direction being sufficient to substantially prevent said pads moving out of parallel with each other under braking conditions.

2. A disc brake assembly according to claim 1 wherein a pair of relatively spaced slideways are formed on said anchor bracket arranged facing each other and substantially parallel to the axis of the disc with which the brake is to be used, an inboard and an outboard backing plate being attached in supporting relation to a respective friction pad, each backing plate having end portions each terminating in an abutment portion slidable in one of said slideways, said anchor bracket being resiliently deflectable under load applied by said backing plate abutment portion such that said slideways under load move out of parallel alignment with said disc axis, and said caliper is resiliently deflectable such that said planar faces of said friction pad assemblies are maintained parallel to their respective faces of the disc whilst said abutment portions remain in contact with said out of alignment slideway.

3. A disc brake assembly according to claim 1 wherein said central portion is resiliently flexible.

4. A disc brake assembly according to claim 1 wherein said inboard portion of said caliper is mounted to said cylinder by a resiliently biased pivotal connection, the resilient bias of said connection biasing said inboard and outboard portions into alignment with the axis of said cylinder.

5. A disc brake assembly according to claim 1 wherein the stiffness of the bridge in an axial direction is significantly greater than the stiffness of the bridge in a lateral direction.

6. A disc brake assembly according to claim 1 wherein the bridge is formed from metal plate material bent into an appropriate form.

7. A disc brake assembly according to claim 1 wherein the inboard portion of said bridge is comprised of a pair of arms spaced apart by a certain dimension, and joined together at a position remote from said inboard portion, said cylinder having a lateral dimension which is greater than said certain dimension, said cylinder being mounted to said bridge by said arms resiliently clamping onto opposite sides of said cylinder to hold said cylinder therebetween.

8. A disc brake assembly according to claim 7 wherein said cylinder has a pair of shoulders formed thereon, an abutment surface being formed on each shoulder, and each said arm has an alignment surface formed thereon, said alignment surfaces being held in engagement with said abutment surfaces to thereby operatively align said cylinder and said bridge.

9. A disc brake assembly according to claim 8 wherein each side of said cylinder has a tapered surface thereon facing towards said abutment surface, and said tapered surfaces act on said arms to urge said alignment surfaces into engagement with said abutment surfaces.

10. A disc brake assembly according to claim 9 wherein one said alignment surface is flat and the other alignment surface is convex.

11. A disc brake assembly according to claim 1 wherein said bridge and cylinder are integrally formed, said inboard, outboard and central portions of said bridge being comprised of frame elements integrally formed with each other so as to act in a composite manner.

12. A disc brake assembly according to claim 11 wherein said central portion comprises at least three parallel frame elements joined integrally at the inboard portion of the bridge to said cylinder, and joined together at the outboard portion by a beam extending transverse to the length of said frame elements, said beam having greater rigidity in a direction perpendicular to said disc axis than said frame elements.

13. A disc brake assembly according to claim 1 wherein said outboard pad assembly is rotatable relative to said bridge to a limited extent about an axis which is parallel to the axis of the disc with which said brake assembly is to be used.

14. A disc brake assembly according to claim 13 wherein said outboard portion is comprised by a pair of fingers joined together, and the inboard side of said fingers each have a groove formed therein, the outboard side of the outboard pad assembly having a pair of outwardly facing lugs thereon each of which locates in a respective one of said grooves, said lugs and grooves coacting to limit rotation and radial movement of said outboard Pad assembly relative to said bridge.

15. A disc brake assembly according to claim 14 wherein said outboard pad assembly has an outwardly directed flange thereon which locates between said fingers and limits the extent to which said pad assembly can move laterally relative to said bridge.

16. A disc brake assembly according to claim 13 wherein a bias spring acts between said outboard portion and said outboard backing plate to urge said outboard backing plate into frictional contact with said outboard portion, said bias spring functioning to provide limits for radial and axial rotation of said backing plate relative to said outboard portion.

* * * * *